United States Patent [19]

Kondo

[11] Patent Number: 5,241,381
[45] Date of Patent: Aug. 31, 1993

[54] VIDEO SIGNAL COMPRESSION USING 2-D ADRC OF SUCCESSIVE NON-STATIONARY FRAMES AND STATIONARY FRAME DROPPING

[75] Inventor: Tetsujiro Kondo, Tokyo, Japan

[73] Assignee: Sony Corporation, Tokyo, Japan

[21] Appl. No.: 745,855

[22] Filed: Aug. 16, 1991

[30] Foreign Application Priority Data

Aug. 31, 1990 [JP] Japan .................................. 2-231535

[51] Int. Cl.⁵ .............................................. H04N 7/13
[52] U.S. Cl. ....................................... 358/133; 358/105
[58] Field of Search ................ 358/105, 136, 133, 138

[56] References Cited

U.S. PATENT DOCUMENTS

| | | | |
|---|---|---|---|
| 4,802,005 | 1/1989 | Kondo . | |
| 4,837,618 | 6/1989 | Hatori et al. | 358/136 X |
| 4,845,560 | 7/1989 | Kondo et al. | 358/105 X |
| 5,008,747 | 4/1991 | Carr et al. | 358/136 |
| 5,068,726 | 11/1991 | Kondo et al. | 358/136 X |
| 5,128,759 | 7/1992 | Matsunaga | 358/136 X |

FOREIGN PATENT DOCUMENTS

| | | |
|---|---|---|
| 0293189 | 11/1988 | European Pat. Off. . |
| 0330455A3 | 8/1989 | European Pat. Off. . |
| 0417914A2 | 3/1991 | European Pat. Off. . |
| 0430531A2 | 6/1991 | European Pat. Off. . |

OTHER PUBLICATIONS

Patent Abstracts of Japan vol. 10, No. 32 (E-379) Feb. 7, 1986 & JP-A-60 189 388 (Fujitsu) Sep. 26, 1985.

*Primary Examiner*—Victor R. Kostak
*Attorney, Agent, or Firm*—William S. Frommer; Alvin Sinderbrand

[57] ABSTRACT

An apparatus for highly efficient encoding of a digital image signal comprising frames of pixels converts the digital image signal into a blocked signal, sub-samples the blocked signal to reduce the number of pixels in each block by one-half and then performs adaptive dynamic range coding (ADRC) and frame dropping on the sub-sampled signal. The ADRC compresses the amount of pixel data in a first frame to half of a two-frame target value by subtracting the minimum value of the pixels in a block from each of pixels in the block, then representing each of the resultant pixel data values with a smaller number of bits than was originally used. This smaller number is determined based on the dynamic range of the block and the target value. A second frame following the first frame is dropped if it is detected as a stationary frame, or is compressed using ADRC to the two-frame target value reduced by the amount of data generated for the first frame if detected as a non-stationary frame.

9 Claims, 10 Drawing Sheets

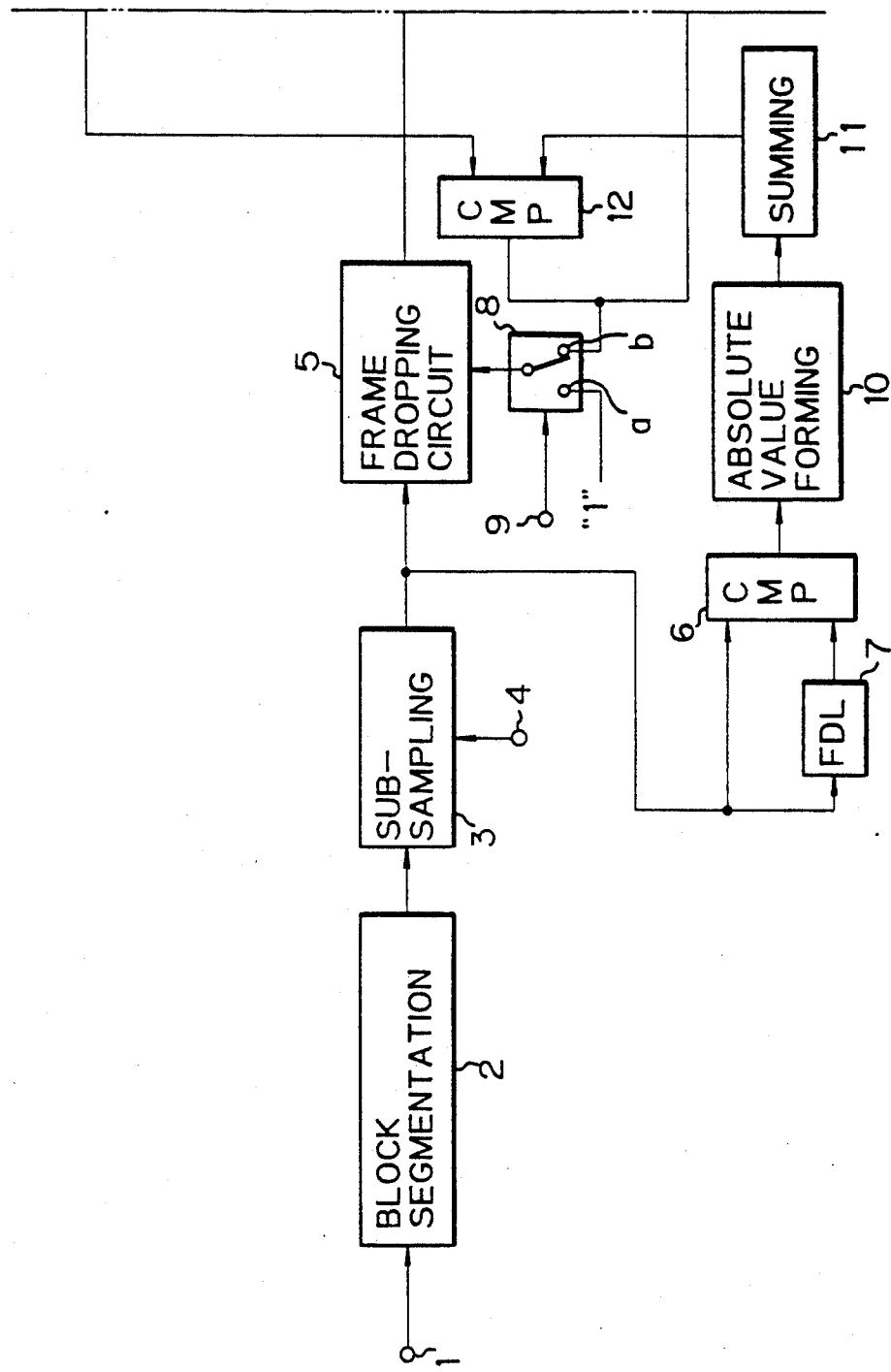

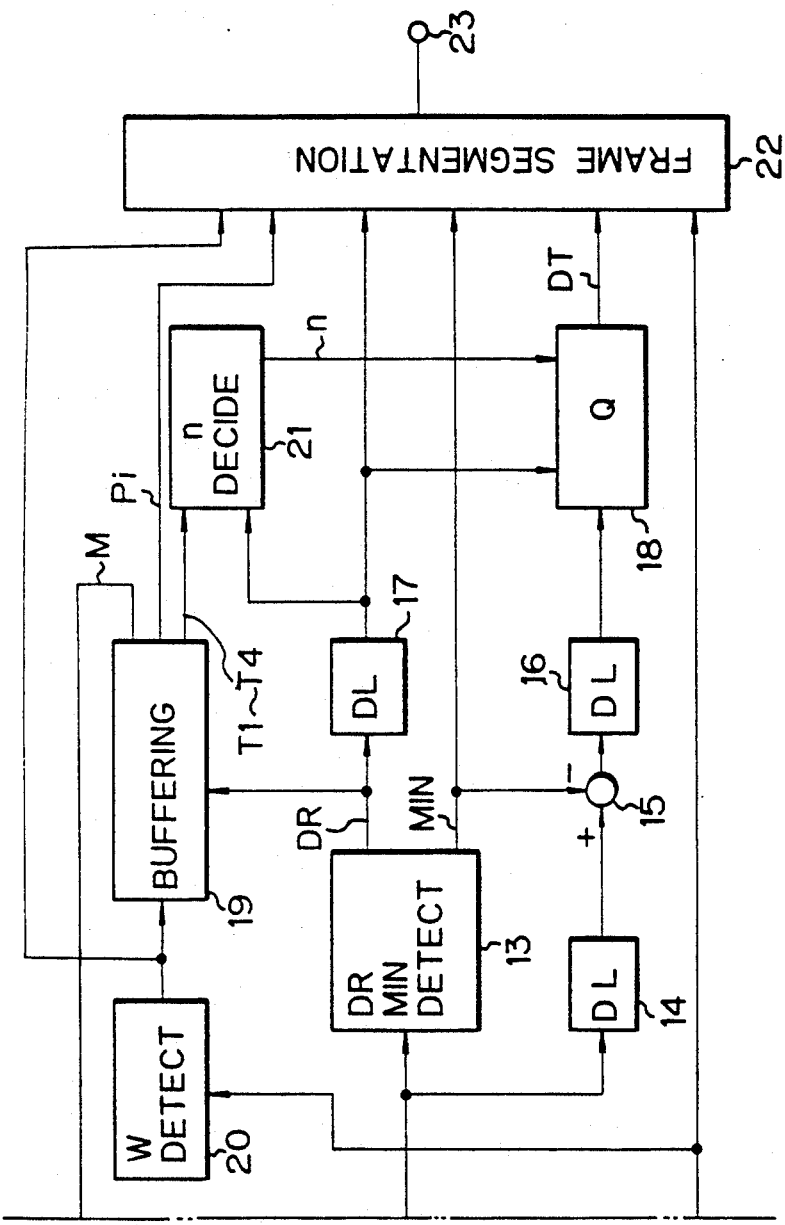

Fig. 4

|     | P 1 | P 2 | | P32 |
| --- | --- | --- | --- | --- |
| T 1 | 1 | 1 | ----- | 18 |
| T 2 | 2 | 2 | ----- | 41 |
| T 3 | 4 | 5 | ----- | 103 |
| T 4 | 8 | 10 | ----- | 255 |
| M   | 0 | 1 | | 50 |

| Fig. 7A | Fig. 7B |

VIDEO SIGNAL COMPRESSION USING 2-D ADRC OF SUCCESSIVE NON-STATIONARY FRAMES AND STATIONARY FRAME DROPPING

BACKGROUND OF THE INVENTION

1. Field of the Invention

The invention relates to an apparatus for highly efficient coding of a digital image signal which is applied to a digital VTR or the like.

2. Description of the Prior Art

There have been known several highly efficient video signal coding methods whereby a mean bit length per pixel or a sampling frequency is reduced in order to fit the encoded signal into a narrower transmission band. The applicant of the present invention has already proposed highly efficient coding apparatuses in which a dynamic range which is specified by the maximum and minimum values of a plurality of pixels which are included in a two-dimensional block or a three-dimensional block is obtained and an encoding adapted to the dynamic range is executed (refer to JP-A-61-144989, JP-A-62-92620). Further, as disclosed in JP-A-62-128621, there has been proposed a variable length coding method in which a bit length used to represent data is changed in accordance with a dynamic range so that a maximum distortion due to quantization is set to be constant.

According to the adaptive dynamic range coding method (hereinafter, referred to as ADRC) which has been proposed above, the dynamic range DR (difference between the maximum value MAX and the minimum value MIN) is calculated for every two-dimensional block comprising, for instance, 64 pixels (=8 lines × 8 pixels). The minimum level (minimum value) in the block is subtracted from each of the input pixel data. Each of the pixel data after the minimum value was subtracted is converted into a representative quantized level. The above quantization relates to processes for dividing the dynamic range DR which has been detected into four quantization level ranges corresponding to a bit length such as two bits which is smaller than the original unquantized bit length, for detecting the quantization level range to which each pixel data in the block belongs, and for generating a code signal indicative of the level range.

A highly efficient coding apparatus in which a three dimensional ADRC and a frame dropping process are combined in order to further raise a compression ratio has also been proposed by the applicant of the present invention. According to the above apparatus, motion between two areas of a three-dimensional block is detected, three-dimensional ADRC is executed in the block having motion, and in the stationary block, the transmission of one of the areas is omitted and two-dimensional ADRC is executed with respect to a block comprising a mean value of the two areas.

In the above apparatus in which the three-dimensional dimensional ADRC and the frame dropping process are combined, there is need for a memory capacity of two frames for a block segmentation process to form a three-dimensional block. When a buffering process is applied to the above apparatus, an additional memory of two frames is necessary to delay input data for a time until the number of bits to be assigned is decided by a buffering process. A memory capacity of two frames is also needed for a block desegmentation process in a decoding apparatus. As mentioned above, there is a problem in that the necessary memory capacity is extremely large.

OBJECTS AND SUMMARY OF THE INVENTION

It is, therefore, an object of the present invention to provide a highly efficient coding apparatus in which high compression ratio can be achieved by a compression encoding such as ADRC or the like and frame dropping so that a required memory capacity is reduced.

According to an aspect of the present invention, there is provided an apparatus for highly efficient coding of a digital image signal, comprising:

means for converting the digital image signal into a block signal in which each frame of the digital image signal is arranged in a plurality of blocks of pixel data;

means for supplying a pixel data signal consisting of blocks of the blocked signal selected in response to a control signal;

control signal generating means for generating the control signal so that a first block of a first frame is always selected and a second block located in a spatially same position of a second frame as the first block occupies in the first frame is selected or dropped in accordance with an absolute value of a difference between values of pixel data at the same position in the first and second blocks; and coding means for compression encoding the pixel data on a block unit basis.

According to another aspect of the present invention, there is provided an apparatus for highly efficient coding of a digital image signal, comprising:

means for converting the digital image signal into a blocked signal in which each frame of the digital image signal is arranged in a plurality of blocks of pixel data;

sub-sampling means for sub-sampling the blocked signal with a sub-sampling phase which is inverted at every two successive frames so as to produce a sub-sampled signal;

means for supplying a pixel data signal consisting of blocks of the sub-sampled signal selected in response to a control signal.

control circuit signal generating means for generating the control signal so that a first block of a first frame is always selected and a second block located in a spatially same position of a second frame as the first block occupies in the first frame is selected or dropped in accordance with an absolute value of a difference between values of pixel data at a same position in the first and second blocks; and coding means for compression encoding the pixel data on a block unit basis.

The above, and other, objects, features and advantages of the present invention will become readily apparent from the following detailed description thereof which is to be read in connection with the accompanying drawings.

BRIEF DESCRIPTION OF THE DRAWINGS

FIGS. 1, 1A and 1B are diagram showing how FIGS. 1A and 1B are to be read together; FIGS. 1A and 1B together are block diagrams showing an embodiment of the present invention;

FIG. 4 is a schematic diagram of a threshold value table;

FIG. 6B is a diagram used for explaining an accumulative frequency distribution table formed by the buffering circuit of FIG. 3;

DETAILED DESCRIPTION OF THE PREFERRED EMBODIMENT

Figure 2:
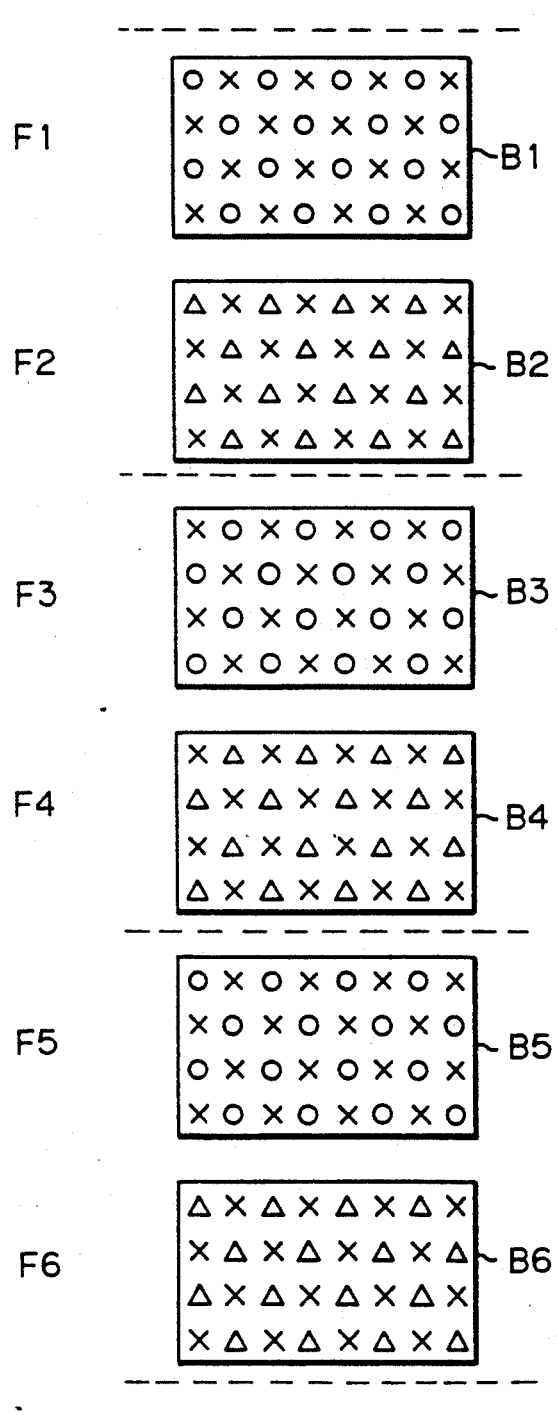
FIG. 2 is a schematic diagram which is used for explanation of a sub-sampling process.

The invention will be described hereinbelow with reference to the drawings. The description will be made in the following order:
a. Whole apparatus
b. Buffering circuit
c. Explanation of the operation of an embodiment
d. Modification a. Whole apparatus

In FIG. 1, (FIGS. 1A and 1B are herein referred to as FIG. 1) a digital video signal is supplied to an input terminal shown by reference numeral 1. The input digital video signal is supplied to a block segmentation circuit 2. The block segmentation circuit 2 converts the video signal arranged in a raster scan order into a blocked signal supplied in the order of the blocks. That is, a picture plane of one frame is segmented into two-dimensional blocks of, for instance, (4 lines × 8 pixels). Different from a three-dimensional block, when a two-dimensional block is formed, the required memory capacity of the block segmentation circuit 2 can be reduced.

The blocked signal from the block segmentation circuit 2 is supplied to a sub-sampling circuit 3. The sub-sampling circuit 3 reduces the number of pixels into ½ by a quincunx sub-sampling pattern. Therefore, the number of pixels in one block in a sub-sampling signal output from the sub-sampling circuit 3 is equal to sixteen. A control signal to cause sub-sampling patterns of complementary forms every two frames is supplied from a terminal 4 to the sub-sampling circuit 3. Motion between the blocks can be detected from a difference of the pixel data of one frame by the sub-sampling.

FIG. 2 shows sub-sampling patterns. B1, B2, B3, ... denote blocks which are located at a spatially same position and respectively belong to successive frames F1, F2, F3, .... A number of blocks other than the blocks shown in the diagram are included in each frame. In FIG. 2, ○ and △ denote transmission pixels and × indicates non-transmission pixels. In respective two frame periods of the frames F1 and F2 and the like, the sub-sampling patterns are the same. As shown by indicated by broken lines, the sub-sampling pattern of two frames and the pattern of the next two frames have complementary shapes.

The sub-sampling signal from the sub-sampling circuit 3 is supplied to a frame dropping circuit 5 which drops frames on a block unit basis, a comparing circuit 6, and a frame delay circuit 7. A control signal to control whether frames should be dropped or not, that is, to control the selecting or dropping of the blocks is supplied to the frame dropping circuit 5 through a switching circuit 8. The switching circuit 8 is controlled by a switching signal from a terminal 9 so as to alternately select input terminals a and b at one frame period.

A signal of "1" is always supplied to the input terminal a of the switching circuit 8. For the frame dropping circuit 5, "1" denotes that the block is selected for transmission. Therefore, the blocks B1, B3, B5, ... included in the frames F1, F3, F5, ... before two successive frames are circuit 8 is selected and the selecting or dropping of the blocks is adaptively controlled. That is, the selecting or dropping of the blocks is controlled on the basis of the absolute value of a frame difference between the preceding frame and the present frame.

The comparing circuit 6 detects a difference (namely, frame difference) between the values of the pixels of the present frame and the preceding frame. The frame difference is converted into an absolute value by an absolute value forming circuit 10. An output signal of the absolute value forming circuit 10 is supplied to a summing circuit 11. The absolute values among the frame differences with respect to every two pixels are summed by the summing circuit 11 for one block. An output of the summing circuit 11 is supplied to a comparing circuit 12.

A motion threshold value M is supplied to the comparing circuit 12 from a buffering circuit 19, which will be explained hereinlater. When the summed value is equal to or smaller than the threshold value M, an output of the comparing circuit 12 is set to "0". In the other cases, the output of the comparing circuit 12 is set to "1". In other words, when the summed value is equal to or less than the motion threshold value M, the frame dropping process in which the block is dropped is executed. The data corresponding to the motion amount between the blocks can alternatively be formed by a method other than that shown in the present embodiment.

The output of the comparing circuit 12 to control the selecting or dropping of the block is also supplied to a detecting circuit 20 in order to detect a transmission ratio w. The detecting circuit 20 detects a transmission ratio w for one frame period. Since the adaptive frame dropping is executed in the frames F2, F4, ... after every two frames, a transmission ratio w of the data to be transmitted to the original data changes in each frame after the two frames. Since the total number of blocks in one frame is known, a ratio of the number of blocks which are transmitted to the total number is detected as a ratio w. An output signal of the detecting circuit 20 is supplied to the buffering circuit 19. The output signal of the detecting circuit 20 is also necessary to indicate the block which has been frame-dropped at the reception side and is supplied as a frame dropping flag to a frame segmentation circuit 22 and is transmitted together with various encoding data, which will be explained hereinlater.

An ADRC encoder is connected to the frame dropping circuit 5. The buffering circuit 19 is provided as part the encoder.

An output signal of the frame dropping circuit 5 is supplied to a detecting circuit 13 and a delay circuit 14. The detecting circuit 13 detects the dynamic range DR and the minimum value MIN of the block. The delay pixel circuit 14 delays data to enable detection of the minimum value MIN and the dynamic range DR. The subtracting circuit 15 subtracts the minimum value MIN from each of the pixel data from the delay circuit 14, so that the pixel data from which the minimum value has been subtracted are supplied from the subtracting circuit 15.

The output data of the subtracting circuit 15 and the dynamic range DR are supplied to a quantizing circuit 18 through delay circuits 16 and 17, respectively. An encoded signal DT of an n-bit length (n=0, 1, 2, 3, or 4 bits) smaller than the original bit length (8 bits) is obtained from the quantizing circuit 18. The quantizing circuit 18 executes quantization adapted to the dynamic range DR. That is, the pixel data from which the minimum value has been subtracted is divided by a quantization step $\Delta$ which is obtained by dividing the dynamic range DR into $2^n$ equal steps. An integer value which is obtained by omitting a fraction of the quotient is used as a code signal DT. The quantizing circuit 18 can be constructed of a dividing circuit or a ROM.

A bit length n which is assigned to the code signal DT is determined in a manner such that an amount of data generated per predetermined period, for instance, every two frames does not exceed a target value L (bits). For such a buffering, the buffering circuit 19 to which the dynamic range DR is supplied is provided. A plurality of, for example, 32 sets (T1, T2, T3, T4, M) of threshold values are prepared for the buffering circuit 19 as will be explained hereinlater. The sets of the threshold values are distinguished by parameter codes Pi (i=1, 2, 3, ..., 32). The amount of data generated is set so as to monotonically decrease as the number i of the parameter code Pi increases. However, the picture quality of the reconstructed image deteriorates with a decrease in the amount of data generated.

The threshold values T1 to T4 for the quantization level divisions from the buffering circuit 19 and the dynamic range DR which has been transmitted through the delay circuit 17 are supplied to a bit length deciding circuit 21. The delay circuit 17 is provided to delay the dynamic range data by a time which is required to decide the quantization level threshold values by the buffering circuit 19. The dynamic range DR and the quantization level threshold values T1 to T4 (T1<T2<T3<T4) are supplied to the bit length deciding circuit 21. The bit length n to be used is determined on the basis of the magnitudes of the dynamic range DR and the threshold values T1 to T4.

The encoded outputs DR, MIN, and DT of the ADRC encoder, the flag indicative of the selecting or dropping of the block, and the parameter codes Pi are supplied to the frame segmentation circuit 22. The transmission data is supplied therefrom to an output terminal 23. The frame segmentation circuit 22 forms the transmission data by adding a sync signal to the above encoded outputs. The frame segmentation circuit 22 also appends an error correction code to the above encoded outputs.

Although not shown, on the receiving side, there are provided a frame desegmentation circuit, an ADRC decoder, a circuit to interpolate the frame dropped block from the preceding block, a circuit to interpolate the pixels where were not transmitted, a block desegmentation circuit, and the like. The ADRC decoder decodes the bit length n using the threshold values T1 to T4 which are designated by the parameter codes Pi and the dynamic range DR and reconstructs the pixel data value by using the quantization step $\Delta$ according to the bit length n and the dynamic range DR and the value of the code signal DT. Further, the minimum value MIN is added to the reconstructed level.

b. Buffering circuit

Figure 3:
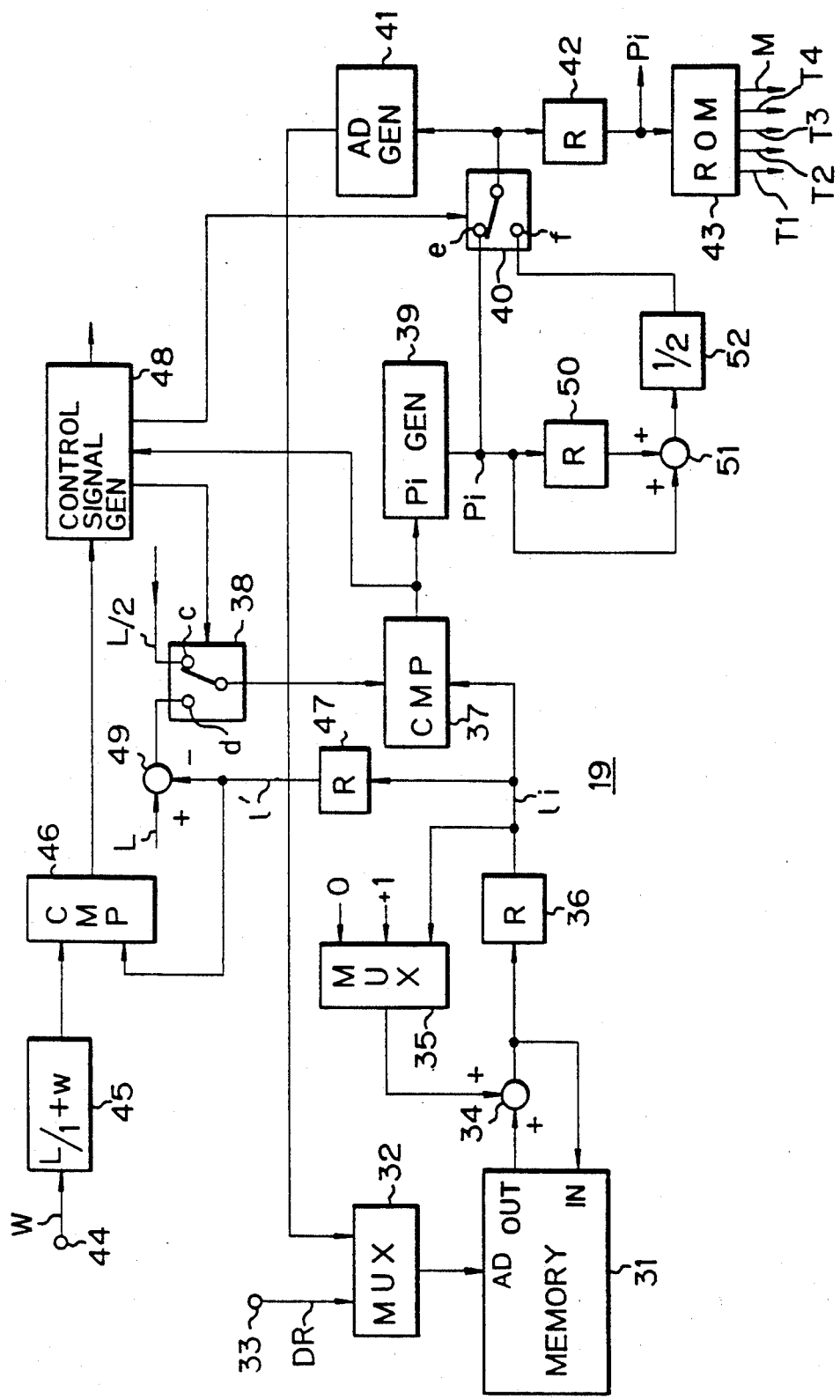
FIG. 3 is a block diagram of the details of a buffering circuit shown in FIG. 1B.

FIG. 3 shows an illustrative embodiment of the buffering circuit 19. A memory (RAM) shown by reference numeral 31 is provided for the buffering circuit 19 in order to form a frequency distribution table and an accumulative frequency distribution table. An address is supplied to the memory 31 through a multiplexer 32. The dynamic range DR is supplied as one input of the multiplexer 32 from an input terminal 33 and an address from an address generating circuit 41 is supplied as another input. An output signal of an adding circuit 34 is supplied to the memory 31. Output data of the memory 31 and an output of a multiplexer 35 are added by the adding circuit 34.

An output of the adding circuit 34 is supplied to a register 36. An output of the register 36 is supplied to the multiplexer 35 and a comparing circuit 37. In addition to the output of the register 36, 0 and +1 are supplied to the multiplexer 35. When calculation of an amount of data generated has been performed, a generation data amount l i for one frame period generated by ADRC encoding is obtained in an output of the register 36.

The comparing circuit 37 compares the generation data amount l i and a target value from a switching circuit 38. An output signal of the comparing circuit 37 is supplied to a parameter code generating circuit 39 and a control signal generating circuit 48. The parameter codes Pi from the parameter code generating circuit 39 are supplied through a switching circuit 40 to the address generating circuit 41 and a register 42. The parameter codes Pi taken into the register 42 are supplied to the frame segmentation circuit 22 as mentioned above and are also supplied to an ROM 43. A table of threshold values shown in FIG. 4 has been stored in the ROM 43. The ROM 43 generates sets (T1i, T2i, T3i, T4i, Mi) of the quantization level threshold values in correspondence to the parameter codes Pi which have been input as addresses. The threshold value table is constructed so as to more severely limit the amount of data generated as the number of the parameter code Pi increases. That is, the values of the quantization level threshold values T1 to T4 and the motion threshold value M monotonically increase. As mentioned above, the quantization level threshold values are supplied to the bit length deciding circuit 21 and the motion threshold value M is supplied to the comparing circuit 12.

The transmission ratio w which has been detected by the detecting circuit 20 is supplied to an arithmetic operating circuit 45. Assuming that a target value for the generation data amount for a two-frame period of time of F1 and F2 or the like is set to L, the arithmetic operating circuit 45 executes an arithmetic operation of $L/(1+w)$. The result of the arithmetic operation is supplied to a comparing circuit 46. An output of the arithmetic operating circuit 45 is used as a target value for the present frame when the mean value of the numbers of the sets of the threshold values for the preceding two-frame period is used as data for the present frame.

A generation data amount l' transmitted through a register 47 is supplied to the comparing circuit 46. A comparison output of the comparing circuit 46 is supplied to a control signal generating circuit 48. The generation data amount l' is derived with respect to the present frame when the mean value of the numbers of the sets of the threshold values for the preceding two-frame period is used as data for the present frame. The generation data amount l' is also supplied to a subtracting circuit 49. The subtracting circuit 49 subtracts l' from a target value L for the 2-frame period. (L−l') from the subtracting circuit 49 is supplied to an input terminal d of the switching circuit 38. A target value of L/2 is supplied to the other input terminal c of the switching circuit 38.

The output signal of the comparing circuit 46 is supplied to the control signal generating circuit 48.

The control circuit 48 generates control signals to clear the registers 36, 42, 47, and 50, a signal to control the fetching of the data into the register 42, and switching signals to respectively control the switching circuits 38 and 40. The switching circuit 38 supplies the target value of L/2 to the comparing circuit 37 through the input terminal c in the initialized state and upon detection of a scene change. In the other cases, the switching circuit 38 supplies an output signal of the subtracting circuit 49 to the comparing circuit 37 as a target value.

The parameter codes Pi from the parameter code generating circuit 39 are supplied to an input terminal e of the switching circuit 40, a register 50, and an adding circuit 51. An output of the register 50 is supplied to the adding circuit 51. An output of the adding circuit 51 is supplied to a ½ multiplying circuit 52. The mean value of the parameter codes Pi and Pi+1 indicative of the averaged threshold value of two successive frames is generated from the ½ multiplying circuit 52. The mean value is supplied to an input terminal f of the switching circuit 40. The switching circuit 40 is controlled by the switching signal from the control signal generating circuit 48. When the terminal e of the switching circuit 40 is selected, the parameter codes Pi from the parameter code generating circuit 39 are supplied to the address generating circuit 41. On the other hand, when the input terminal f is selected, the mean values of the parameter codes Pi and Pi+1 indicative of the averaged threshold values are supplied to the address generating circuit 41.

Figure 5:
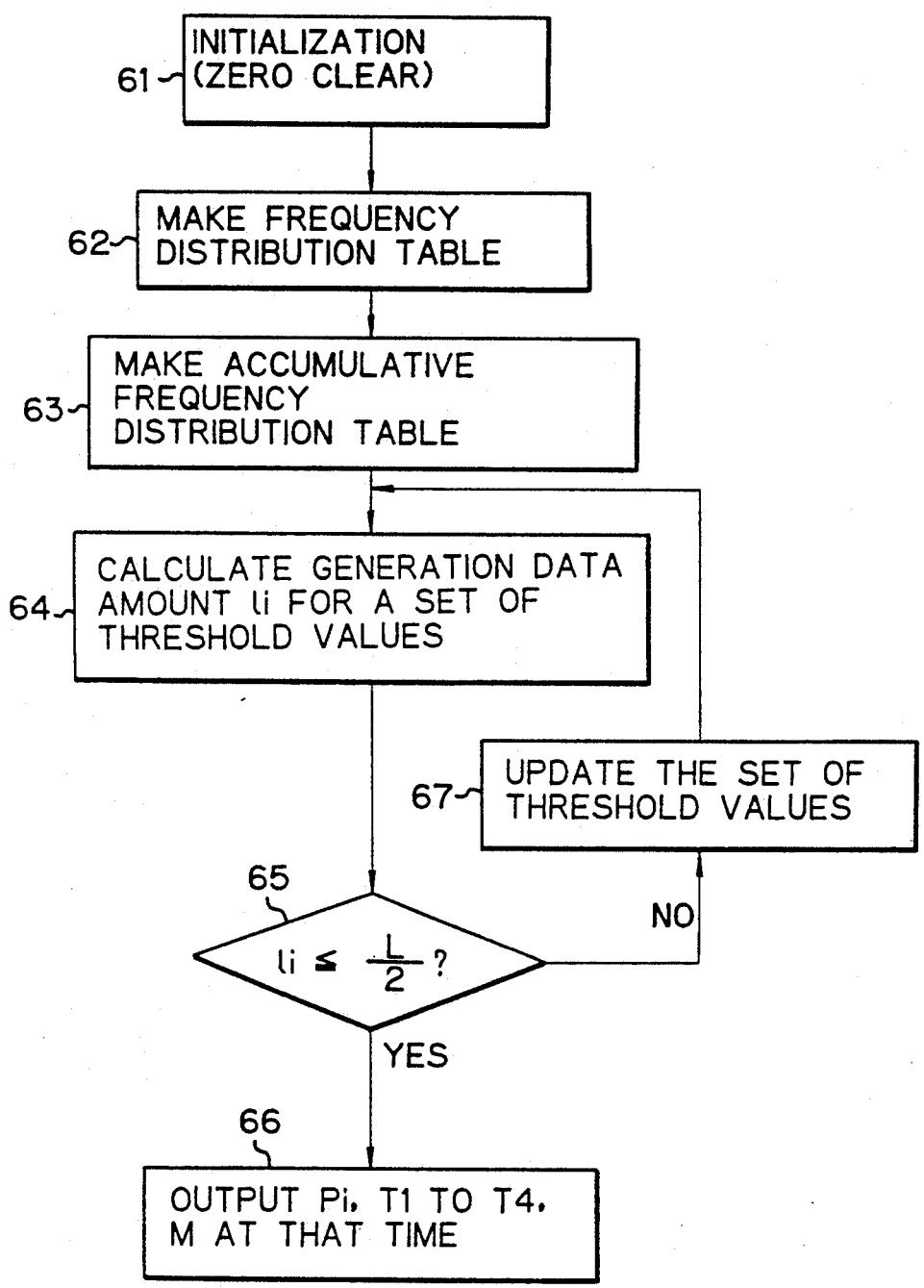
FIG. 5 is a flowchart used for explaining of the operation of the buffering circuit.

In the illustrated embodiment, in the initiatized state or just after a scene change occurs, buffering to control an amount of data which is generated for one frame period to be L/2 or less is executed. That is, in the above case, as shown in FIG. 3, the switching circuit 38 selects the input terminal c and the switching circuit 40 selects the input terminal e. The operation of the buffering circuit 19 in this state will now be described with reference to a flowchart of FIG. 5.

In the first step 61, the memory 31 and the registers 36, 42, 47, and 50 are cleared to zero. To clear the memory 31 to 0, the multiplexer 32 selects the address generated from the address generating circuit 41 and the output of the adding circuit 34 is always set to 0. The address is incremented to (0, 1, 2, . . . , 255) and 0 data is written into all of the addresses in the memory 31.

Figure 6A:
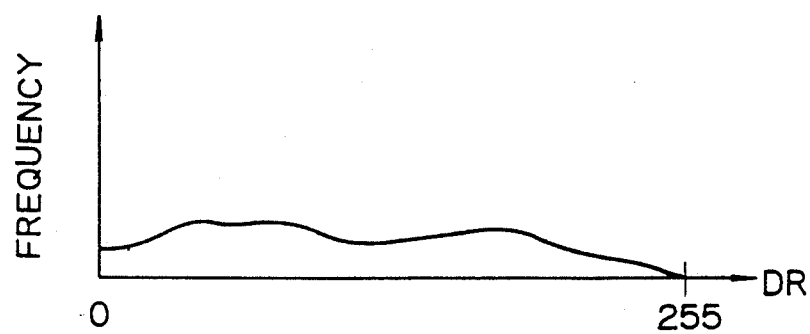
FIGS. 6A and 6B are diagrams used for explaining a frequency distribution table formed by the buffering circuit of FIG. 3.

In the next step 62, a frequency distribution table for the dynamic range DR of the blocks of a current frame in a period of time when buffering is executed is formed in the memory 31. The multiplexer 32 selects the dynamic range DR for each of the blocks in the frame from the terminal 33. The multiplexer 35 selects +1. Therefore, at the end of one frame period, the generation frequency of each DR for each of the blocks in the frame is stored into each address in the memory 31 corresponding to the dynamic range DR. In the frequency distribution table in the memory 31, an axis of abscissa indicates the DR and an axis of ordinate represents the frequency as shown in FIG. 6A.

Figure 6B:
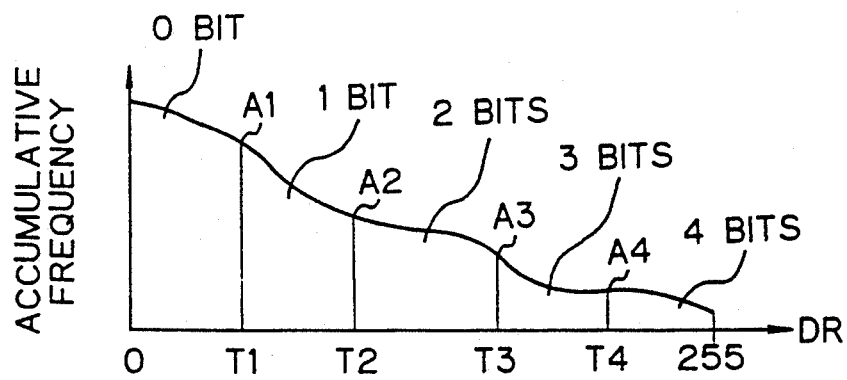

The frequency distribution table is converted into the accumulative frequency distribution table (step 63). When the accumulative frequency distribution table is formed, the multiplexer 32 selects the address from the address generating circuit 41 and the multiplexer 35 selects the output of the register 36. The address is sequentially decreased from 255 to 0. The read-out output of the memory 31 is supplied to the adding circuit 34 and is added to the content in the register 36 by the adding circuit 34. The output of the adding circuit 34 is written into the same address as the read address of the memory 31. The content in the register 36 is updated to the output of the adding circuit 34. In the initial status in which the address in the memory 31 is set to 255, the register 36 has been cleared to 0. When the frequencies have been accumulated with respect to all of the addresses in the memory 31, an accumulative frequency distribution table as shown in FIG. 6B is formed in the memory 31.

A generation data amount l i when the sets (T1i, T2i, T3i, T4i) of the quantization level threshold values have been applied to the accumulative frequency distribution table is calculated (step 64). To calculate the generation data amount l i, the multiplexer 32 selects the output of the address generating circuit 41 and the multiplexer 35 selects the output of the register 36. The parameter code generating circuit 39 generates a parameter code which sequentially changes from P1 to P32. The parameter codes Pi are supplied to the address generating circuit 41 through the switching circuit 40 and the addresses corresponding to the threshold values of (T1i, T2i, T3i, T4i) are sequentially generated.

Values A1, A2, A3, and A4 which have been read out of the addresses corresponding to the threshold values are accumulated by the adding circuit 34 and the register 36. The accumulated value (A1+A2+A3+A4) corresponds to the generation data amount l i when the sets of the threshold values designated by the parameter codes Pi have been applied. That is, in the accumulative frequency distribution table shown in FIG. 6B, a value in which the number (16) of pixels in the block has been multiplied to the total value (A1+A2+ A3+A4) of the values A1, A2, A3, and A4 which had been read out of the addresses respectively corresponding to the threshold values T1, T2, T3, and T4 is equal to the generation data amount (bit length). Since the number of pixels is constant, multiplying by the number of pixels is omitted in the buffering circuit 19 shown in FIG. 3.

The generation data amount l i is compared with the target value L/2 (step 65). The output of the comparing circuit 37 which is generated when li≦L/2) is satisfied is supplied to the parameter code generating circuit 39. The incrementing of the parameter code Pi is stopped. The parameter code Pi is stored in the register 42. The parameter code Pi from the register 42 and the set of the threshold values from the ROM 43 are generated (step 66).

If (l i≦L/2) is not satisfied in discriminating step 65 in the comparing circuit 37, the parameter codes Pi are incremented to the next parameter codes Pi+1 and the address corresponding to Pi+1 is generated from the address generating circuit 41. In a manner similar to the above, a generation data amount l i+1 is calculated, used as the new 8i, with the target value L/2 by the comparing circuit 37. The above operations are repeated until ($1 \leq i \leq L/2$) is satisfied.

c. Explanation of the operation of an embodiment

Figures 7, 7A:
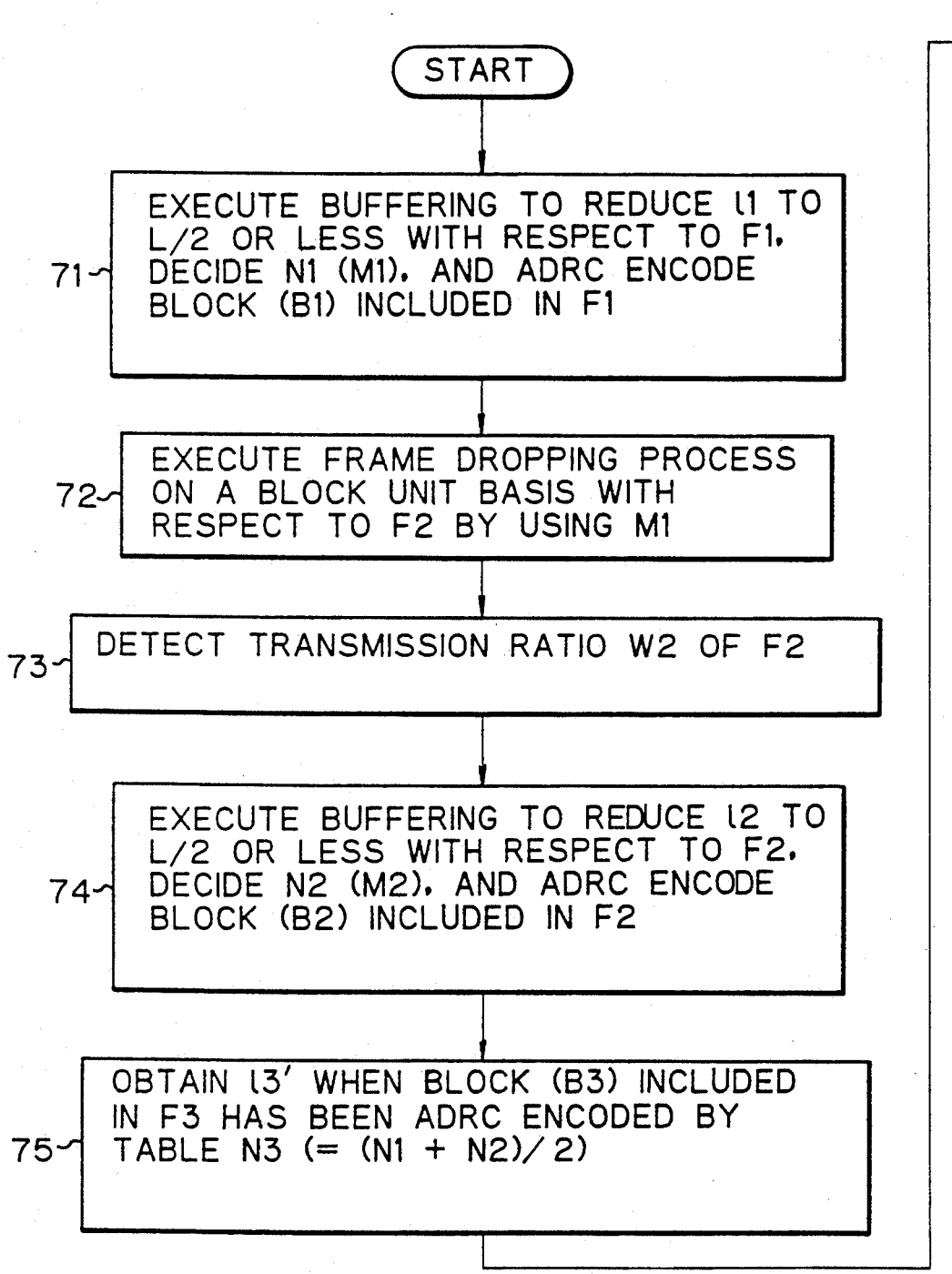
FIGS. 7, 7A and 7B are flowcharts used for further explaining the operation of the buffering circuit.
Figure 7B:
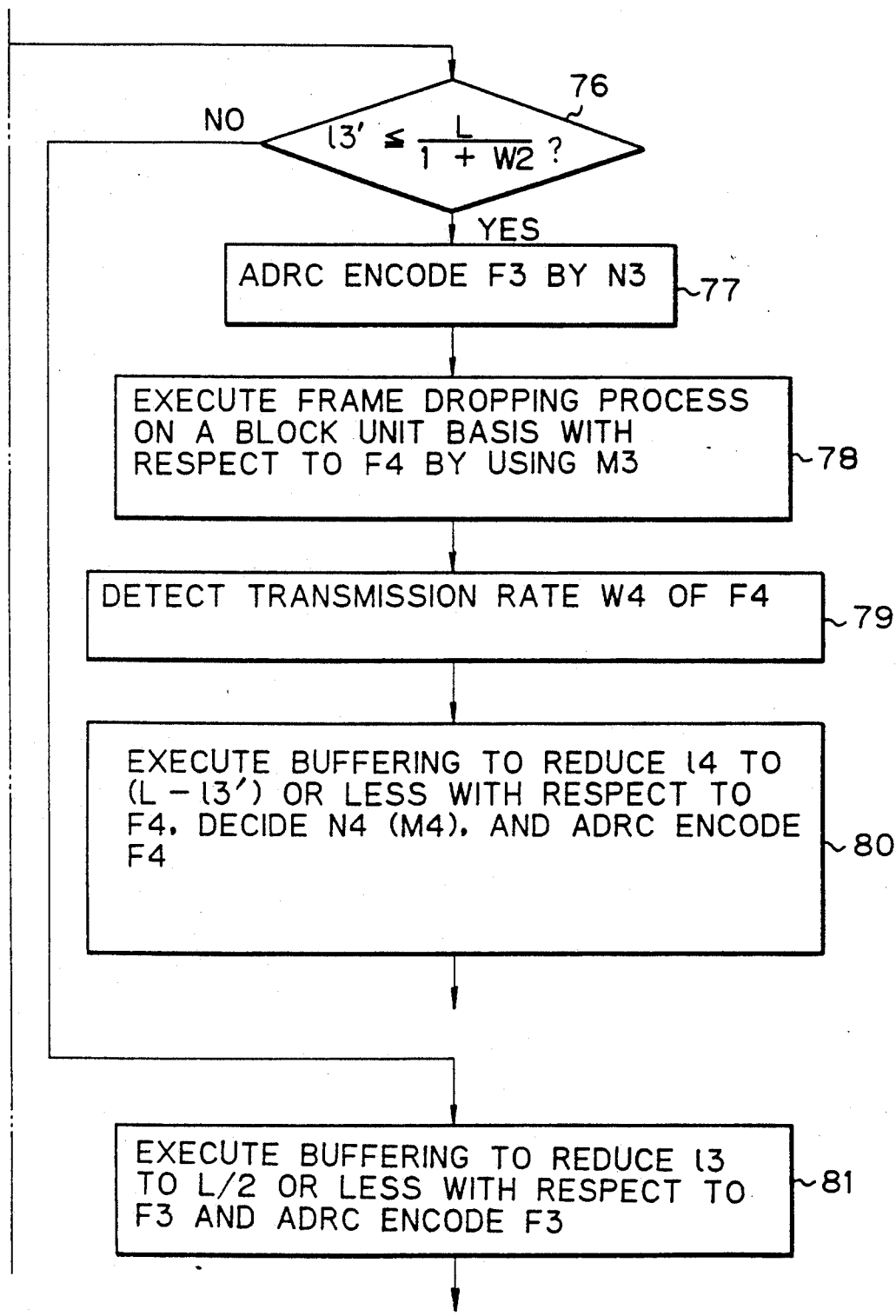

The operation of the embodiment will be described with reference to FIG. 7. In an initiatized state in which the image data of the first frame F1 shown in FIG. 2 is input, buffering to reduce the amount l 1 of data which is generated for the frame F1 L/2 or less is executed, as described above in conjunction with FIG. 5. The two-dimensional ADRC encoding is executed using the quantization level threshold values T1 to T4 at that time (step 71). N1 denotes the number of the threshold value used in the frame F1, that is, the number i which coincides with the parameter code Pi of the threshold value used.

In the next frame F2, the frame dropping process is executed on a block unit basis using the motion threshold value M indicated by N1 (step 72). The transmission ratio w2 of the frame F2 after completion of the frame dropping process is detected by the detecting circuit 20 (step 73). The data of the frame F2 after completion of the frame dropping process is ADRC encoded (step 74). The threshold value at that time is set so as to reduce the generation data amount L 2 to L/2 or less in a manner similar to the frame F1.

Figure 8:
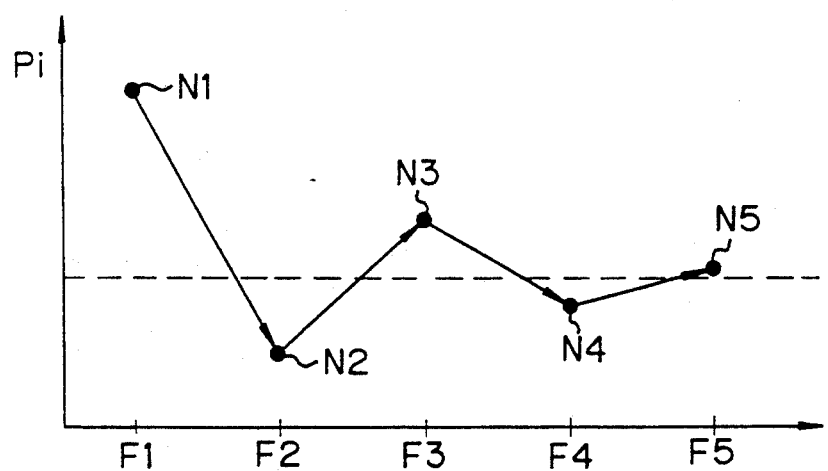
FIG. 8 is a diagram used for explaining the operation of the present invention.

With respect to the frames F1 and F2, the target value L for the 2-frame period is set to one half of its value, thereby setting the target value L/2 for the one frame period. For the frame F2, however, an amount of data to be transmitted is reduced by sub-sampling. Thus, as shown in FIG. 8, the number N1 of the threshold value for the frame F1 is large and the number N2 of the threshold value for the frame F2 is fairly small.

After an accumulative frequency distribution table was formed with regard to the next frame F3, a generation data amount l 3' when the encoding has been executed by the mean value N3 of the numbers N1 and N2 of the threshold values of the two preceding frames F1 and F2 is obtained (step 75). The generation data amount l 3' is supplied to the comparing circuit 46 through the register 47. The comparing circuit 46 executes a comparing operation of ($l 3' \leq L/(1+w2)$) (step 76).

When the above relation is satisfied, the data of the frame F3 is encoded using the quantization level threshold value indicated by the number N3 (step 77). On the contrary, when the above relation is not satisfied, it is determined that a scene change has occurred. The buffering so as to reduce the generation data amount l 3 regarding the frame F3 to L/2 or less is performed and the data of the frame F3 is encoded using the threshold value determined by the buffering (step 81). the above process is similar to that used in the initialized state in step 71. The operations similar to those in step 71 and subsequent steps are repeated hereinbelow.

When the relation in step 76 is satisfied, the frame dropping process for the frame F4 is executed using the motion threshold value M3 indicated by the number N3 of the threshold value (step 78). A ratio w4 of the transmission data of the frame F4 after the frame dropping is detected (step 79).

In the buffering for the frame F4, (L−l 3') formed by the subtracting circuit 49 is used as a target value. That is, in the preceding frame F3, since the amount of data l 3' has been generated for the target value L for the 2-frame period, the amount of data generated in the frame F4 is constrained to a value which is equal to or less than the remaining target data amount of (L−l 3'). The data of the frame F4 is encoded using the threshold value indicated by the number N4 determined by the buffering (step 80). The next process of step 80 is similar to that in step 75 and processes similar to those mentioned above are repeated.

In the embodiment in which the above operations are executed, when the scene change does not occur, as shown in FIG. 8, the number indicating the set of threshold values converges to a mean value shown by a broken line for the frame F3 and subsequent frames.

d. Modification

In the above description, the dynamic range DR and the minimum value MIN are transmitted in order to describe the dynamic range information. However, the maximum value MAX or the quantization step width can be alternatively be transmitted in place of the dynamic range DR.

On the other hand, in the above embodiment, the encoding process has been applied to the pixel data themselves of the block after each 2-frame period. However, the encoding can be also performed on a difference (residual) between each pixel data of the preceding frame and each pixel data of the next frame. That is, in such a case, the data corresponding to the pixels in each block of the next frame has differential value.

The invention, further, can use a block encoding of a DCT (Discrete Cosine Transform) or the like other than the foregoing ADRC. In the case of the DCT, the encoding using the above differential value in place of the pixel data is effective.

According to the invention, since the ADRC compression encoding or the like is executed for a two-dimensional block, the necessary memory capacity can be reduced as compared with a three-dimensional block. On the other hand, since a hybrid construction is used combining frame dropping on a block unit basis and compression encoding, the compression ratio can be raised.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. An apparatus for highly efficient coding of a digital image signal, comprising:
    means for converting said digital image signal into a blocked signal in which each frame of said digital image signal is arranged in a plurality of blocks of pixel data;
    means for supplying a pixel data signal consisting of blocks of said blocked signal selected in response to a control signal;
    control signal generating means for generating said control signal so that a first block of a first frame is always selected and a second block located in a spatially same position of a second frame as said first block occupies in said first frame is selected or dropped based on a comparison of an absolute value of a difference between values of pixel data at the same position in said first and second blocks with a motion threshold value;

coding means for compression encoding said pixel data signal on a block unit basis to generate compressed data; and means for generating said motion threshold value in accordance with an amount of said compressed data generated by said coding means.

2. An apparatus for highly efficient coding according to claim 1, wherein said coding means uses a difference between pixel data located at the same position in said first and second blocks in place of the data of said second block.

3. An apparatus for highly efficient coding according to claim 1, wherein said coding means includes quantizing means for quantizing said pixel data signal using a bit length shorter than a bit length of said digital image signal, thereby performing dynamic range adapting to a difference between a maximum value and a minimum value of said pixel data in each of said blocks.

4. An apparatus for highly efficient coding of a digital image signal, comprising:

means for converting said digital image signal into a blocked signal in which each frame of said digital image signal is arranged in a plurality of blocks of pixel data;

sub-sampling means for sub-sampling said blocked signal with a sub-sampling phase which is inverted at every two successive frames so as to produce a sub-sampled signal;

means for supplying a pixel data signal consisting of blocks of said sub-sampled signal selected in response to a control signal;

control signal generating means for generating said control signal so that a first block of a first frame is always selected and a second block located in a spatially same position of a second frame as said first block occupies in said first frame is selected or dropped in accordance with an absolute value of a difference between values of pixel data at the same position in said first and second blocks; and coding means for compression encoding said pixel data signal on a block unit basis.

5. An apparatus for highly efficient coding of a digital image signal, comprising:

means for converting said digital image signal into a blocked signal in which each frame of said digital image signal is arranged in a plurality of blocks of pixel data;

means for supplying a pixel data signal consisting of blocks of said blocked signal selected in response to a control signal;

control signal generating means for generating said control signal so that a first block of a first frame is always selected and a second block located in a spatially same position of a second frame as said first block occupies in said first frame is selected or dropped in accordance with an absolute value of a difference between values of pixel data at the same position in said first and second blocks; and coding means for compression encoding said pixel data signal on a block unit basis and including means for detecting a minimum value of each of said blocks of said pixel data signal and means for subtracting said minimum value from each of said pixel data in the respective block of said pixel data signal having said minimum value.

6. An apparatus for highly efficient coding of a digital image signal, comprising:

means for converting said digital image signal into a blocked signal in which each frame of said digital image signal is arranged in a plurality of blocks of pixel data;

means for supplying a pixel data signal consisting of blocks of said blocked signal selected in response to a control signal;

control signal generating means for generating said control signal so that a first block of a first frame is always selected and a second block located in a spatially same position of a second frame as said first block occupies in said first frame is selected or dropped in accordance with an absolute value of a difference between values of pixel data at the same position in said first and second blocks; and coding means for compression encoding said pixel data signal on a block unit basis and including buffering means for controlling said compression encoding so that said compression encoding for said first frame is controlled in accordance with a mean value of threshold values for a preceding two frames, and for said second frame is controlled so as to limit the amount of data generated for said second frame to less than a target value for a two-frame period reduced by an amount of data generated for said first frame.

7. An apparatus for highly efficient coding according to claim 6, wherein said buffering means includes means for detecting a scene change based on the amount of data generated for said first frame.

8. An apparatus for highly efficient coding according to claim 7, wherein said buffering means limits the amount of data generated for said first frame to be equal to or less than one half of said target value for a two-frame period in an initialized state of said buffering means or when said scene change is detected.

9. An apparatus for highly efficient coding according to claim 6, wherein said buffering means includes a threshold value table containing first threshold values defining quantization level divisions and used to control said amounts of data generated for said first and second frames and second threshold values; and wherein said control signal generating means controls the selecting or dropping of said second block in accordance with said second threshold values.

* * * * *